United States Patent [19]

Kobayashi et al.

[11] Patent Number: 4,662,185
[45] Date of Patent: May 5, 1987

[54] SYSTEM OF CONTROLLING REFRIGERATOR TEMPERATURE

[75] Inventors: Minoru Kobayashi, Shimotsuga; Kenichi Iizuka, Ashikaga; Hideo Uzuhashi, Shimotsuga, all of Japan

[73] Assignee: Hitachi, Ltd., Tokyo, Japan

[21] Appl. No.: 835,095

[22] Filed: Feb. 28, 1986

[30] Foreign Application Priority Data

Mar. 4, 1985 [JP] Japan .................................. 60-41100

[51] Int. Cl.⁴ .............................................. F25B 1/00
[52] U.S. Cl. ..................................... 62/228.4; 62/229
[58] Field of Search ....................... 62/228.4, 215, 229, 62/226, 227, 228.1, 228.5, 231, 157, 158; 236/1 EA; 165/12

[56] References Cited

U.S. PATENT DOCUMENTS 4,407,139 10/1983 Ide et al. ............................. 62/228.4
4,467,616 8/1984 Kitauchi ............................ 62/229 X
4,485,634 12/1984 Yasuda et al. ..................... 62/229 X

FOREIGN PATENT DOCUMENTS 0049844 3/1983 Japan ................................. 62/228.4

Primary Examiner—Harry Tanner
Attorney, Agent, or Firm—Antonelli, Terry & Wands

[57] ABSTRACT

The present invention continuously speed-controls an electric motor for driving a compressor for refrigerant compression such that the compressor is driven in its maximum rpm if the difference (temperature deviation) between a target cooling temperature and an actual temperature is greater than a first predetermined value, the compressor is stopped if the temperature deviation is less than a second predetermined value, and the compressor is speed-controlled by a digital control signal if the temperature deviation is between said first and second predetermined values.

3 Claims, 5 Drawing Figures

SYSTEM OF CONTROLLING REFRIGERATOR TEMPERATURE

BACKGROUND OF THE INVENTION

This invention relates to a system of controlling a refrigerator, in particular to controlling a refrigerator temperature by controlling the speed of a compressor for refrigerant compression.

The conventional refrigerator, which generally uses an induction motor having fixed rpm to drive a compressor, entails problems that sufficient cooling capability corresponding to a temperature load cannot be obtained and thus, if the temperature load is high, it takes more time to reach a target cooling temperature, making it difficult to cool an object of interest sufficiently.

The conventional refrigerator is also accompanied by disadvantages that, if the temperature load is low on the contrary, its produced excessive cooling capability may cause the cooling temperature to be undershot from a target cooling temperature, resulting in frequently repeated interruption of its running, and thus the inside temperature ripples may be made to be greater, adversely affecting the foods to be preserved and leading to unnecessary consumption of power caused by activating and stopping the compressor and to occurrence of intermittent sound.

SUMMARY OF THE INVENTION

A primary object of the invention is to provide a system of controlling refrigerator temperature which overcomes such defects of the prior art technology, i.e. increases the cooling capability to reduce a time period required to reach a target temperature if the temperature load is high, and decreases the cooling capability to maintain a target temperature if the temperature load is low.

The above primary object can be attained by the present invention providing a system for obtaining a desired cooling temperature, comprising apparatus for:

detecting a temperature deviation from the difference between a target temperature for cooling and the actual temperature;

driving a speed controlled compressor in high rpm to increase its cooling capability if the temperature deviation is great; and controlling the compressor to obtain the desired rpm corresponding to a temperature deviation if the temperature deviation is low.

Another important object of the invention is to provide a system which controls refrigerator temperature such that (1) the rpm of a compressor is maximized when the temperature deviation exceeds a certain predetermined positive value, (2) the compressor is stopped when the temperature deviation exceeds a certain predetermined negative value and (3) the compressor is speed-controlled by means of digital control signals between the certain predetermined positive and nagetive values, for smooth proper operation thereof.

DETAILED DESCRIPTION OF PREFERRED EMBODIMENT

Figure 1A:
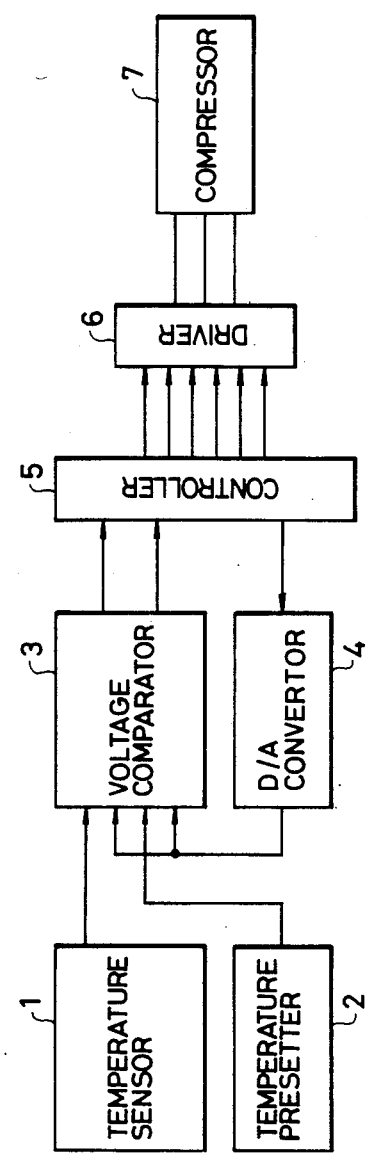
FIGS. 1(a) and 1(b) are block diagrams of a controller used to understand the configuration of the present invention.

One preferred embodiment of the present invention will be described with reference to FIGS. 1 through 4.

Referring now to FIG. 1, a temperature deviation detector section comprises a temperature sensor 1, a temperature presetter 2, a voltage comparator 3, and a D/A converter 4. A controller 5 is for example a microcomputer, which receives a signal from the temperature deviation detector section to produce corresponding speed command. A driver section 6 speed-controls a compressor 7 for refrigerant compression in accordance with the speed command.

Figure 1B:
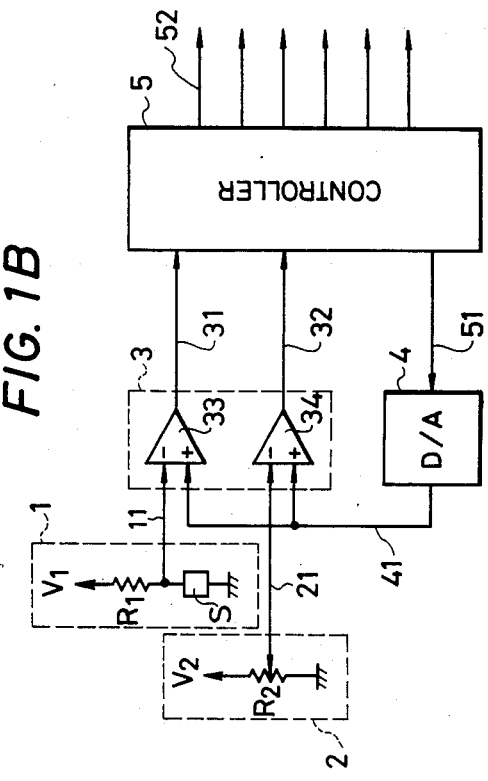

The control operation will be described below in detail. As shown in FIGS. 1A and 1B, the actual temperature $T_A$ in a refrigerator is sensed by temperature sensor 1. A target temperature $T_S$ is set by temperature presetter 2. The analog values of the sensed actual temperature $T_A$ and the set target temperature $T_S$ are converted to the corresponding digital values respectively by voltage comparator 3 and D/A converter 4. The obtained digital signal of the temperature deviation D is entered into controller 5. The control signal (speed command) corresponding to the temperature deviation D is given from controller 5 to driver section 6 to drive the compressor 7 by a certain rpm corresponding to the temperature deviation D.

In FIG. 1B, a temperature sensing element S, resistors R1 and R2, appropriate voltage sources V1 and V2, and voltage comparators 33 and 34 are shown.

Figure 2:
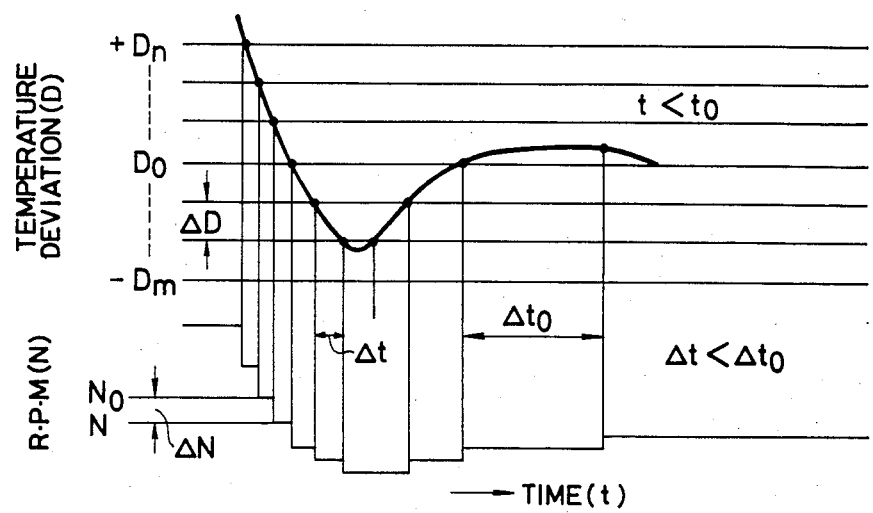
FIG. 2 provides operating characteristics showing a relation between temperature deviation and rpm which describe the control system of the present invention in FIGS. 1(a) and 1(b)

FIG. 2 shows a relation between the temperature deviation D and the speed command for the compressor. $D_0$ refers to a temperature deviation of 0 (zero), where the target temperature and the actual temperature coincide with each other. $+D_i$ refers to any positive value greater than the temperature deviation $D_0$ (i=1, - - - , n, and $D_{i-1} < +D_i$). $-D_j$ refers to any negative value greater than the temperature deviation $D_0$ in absolute value (j=1, - - -, m, and $-D_{j-1} > -D_j$).

If the temperature deviation is greater than $+D_n$, the speed command is given so that the speed of the compressor may be maximized. Thus, more refrigerant is circulated such that the cooling capability is increased and the target temperature can be reached in less time. If the temperature deviation D falls within the range from $-D_m$ to $+D_n$, speed control is activated depending on whether the temperature deviation D is varied by an unit amount $\Delta D$ ($+D_{i-1} \sim +D_i$ or $-D_{j-1} \sim -D_j$, where j=1, - - -, m) within a time period which is no less than $\Delta t_0$ (about 10 minutes). If the temperature deviation D is varied by $\Delta D$ within the period less than $\Delta t_0$, the speed change width $\Delta N$ is determined on the basis of $\Delta t_0$ using the following expression:

$$\Delta N = f(\Delta t), (\Delta t < \Delta t_0) \tag{1}$$

Then, the speed command N as shown in a numerical expression (2) is obtained by adding/subtracting $\Delta N$ to/from $N_0$ (see FIG. 2).

$$N = N_0 \pm \Delta N \qquad (2)$$

If the temperature deviation is not varied by $\Delta D$ within the period less than $\Delta t_0$, the speed change width $\Delta N$ as shown in expression (3) is determined by $\Delta t_0$ on the basis of the absolute value of the temperature deviation D to issue the speed command N by means of the method of expression (2).

$$\Delta N = k \cdot |D|, \quad (\Delta t \geq \Delta t_0) \qquad (3)$$

where, k is a proportional constant.

The cooling capability is controlled by regulating the amount of refrigerant circulated by such speed control means so that the temperature deviation converges to $D_0 (=0)$.

If the temperature deviation is below $-Dm$ even with the compressor in its minimum rpm, the compressor is stopped. The compressor is maintain in the stopped condition from this point until the temperature deviation comes to $D_0$. A temperature hysteresis width is provided to produce the speed command again when the temperature deviation exceeds $D_0$.

Figure 4:
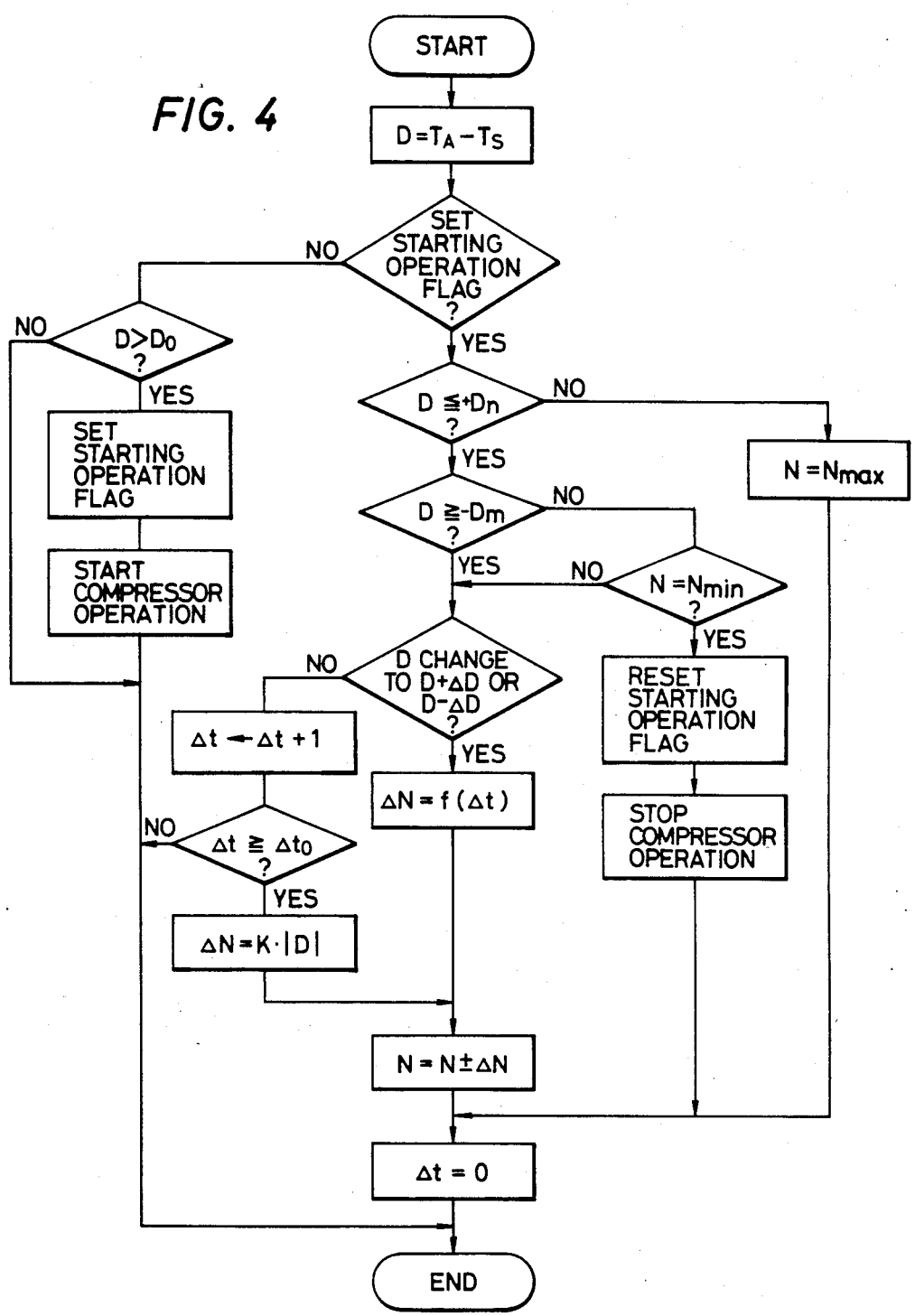
FIG. 4 is a flow chart showing the operation of the temperature control system of the present invention.

Thus, the refrigerator is temperature controlled in accordance with the flow chart as shown in FIG. 4.

In FIG. 4, $\Delta t$ signifies the time period taken for the temperature deviation to vary by the unit amount $\Delta D$. $\Delta t$ is determined by counting up by second.

Each step shown in the flow chart is executed every second. In the flow chart, Nmin signifies the minimum constant rpm of a compressor.

Figure 3:
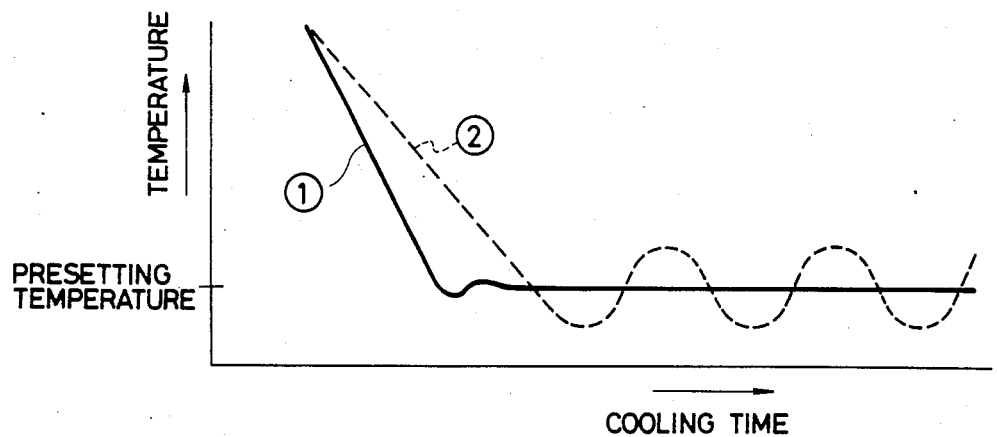
FIG. 3 compares operating characteristics of temperature control of the conventional system and that of the present invention with each other.

The preferred embodiment of the present invention permits the target temperatures to be reached in a short time period as shown in FIG. 3 by the solid line 1 compared with the conventional method as shown in FIG. 3 by the dotted line 2, and provides an effect that temperature variations at a target temperature can be decreased significantly.

The present invention, which provides the capability to speed-control a compressor over the range from minimum to maximum rpm based on the temperature deviation between a target temperature and an actual temperature and thus to vary the cooling ability, can provide a smaller-size compressor, as well as a rapid refrigeration effect that a target temperature is reached in a short time period, a power saving effect achieved by decreasing the cooling ability at a target temperature, improved preservability of foods by decreased temperature ripples, and excellent suppression of noise by lowered rpm.

What is claimed is:

1. A system of controlling a refrigerator temperature comprising:
    means for setting a target temperature;
    means for detecting an actual temperature;
    temperature deviation detecting means for determining as a temperature deviation the difference between said target temperature and said actual temperature;
    a compressor driver capable of continuously varying the rpm of a compressor for refrigerant compression; and
    a controller for issuing to said driver a speed command covering the range from minimum to maximum rpm in accordance with a temperature deviation detected by said temperature deviation detecting means;
    wherein $D_0$ signifies a temperature deviation of zero, $+Di$ signifies any value positive with respect to said $D_0$ (i=1, - - - , n, and $+D_{i-1} < +Di$), and $-Dj$ *signifies any value negative with respect to said $D_0$* (j=1, - - - , m, and $-D_{j-1} < -Dj$);
    characterized in that:
    said compressor is revolved at a maximum constant rpm if said temperature deviation is not less than $+Dn$;
    said compressor is stopped when said temperature deviation is not more than $-Dm$; and
    said compressor is speed-controlled if said temperature deviation falls within the range from $-Dm$ to $+Dn$, speed control means being provided for said compressor to speed-control said compressor by a speed change width corresponding to a time period taken for said temperature deviation to vary by a unit amount $\Delta D$ if said time period is less than a predetermined time value $\Delta t_0$ by a speed change width corresponding to the absolute value of said temperature deviation if said time period is equal to or greater than said predetermined value $\Delta t_0$;
    whereby the rpm of said compressor can be controlled in a desired manner.

2. A system of controlling refrigerator temperature as set forth in claim 1, wherein the time period in which said temperature deviation is varied by the unit amount $\Delta D$ is set at about 10 minutes.

3. A system of controlling refrigerator temperature as set forth in claim 1, characterized in that said speed control means maintains said compressor in the stopped condition after said compressor has been stopped below $-Dm$ until said temperature deviation comes to $D_0$ and provide a temperature hysteresis width so that a speed command is issued when said temperature deviation exceeds $D_0$.

* * * * *